US012568287B2

(12) United States Patent
Shi et al.

(10) Patent No.: US 12,568,287 B2
(45) Date of Patent: Mar. 3, 2026

(54) GENERATING THREE-DIMENSIONAL VIDEOS BASED ON TEXT USING MACHINE LEARNING MODELS

(71) Applicant: Lemon Inc., Grand Cayman (KY)

(72) Inventors: Yichun Shi, Los Angeles, CA (US);
Peng Wang, Los Angeles, CA (US);
Kejie Li, Los Angeles, CA (US)

(73) Assignee: Lemon Inc., Grand Cayman (KY)

( * ) Notice: Subject to any disclaimer, the term of this patent is extended or adjusted under 35 U.S.C. 154(b) by 104 days.

(21) Appl. No.: 18/526,965

(22) Filed: Dec. 1, 2023

(65) Prior Publication Data

US 2025/0184581 A1     Jun. 5, 2025

(51) Int. Cl.
| | |
|---|---|
| *H04N 21/81* | (2011.01) |
| *G06T 19/20* | (2011.01) |
| *H04N 13/275* | (2018.01) |
| *H04N 13/351* | (2018.01) |

(52) U.S. Cl.
CPC ........... *H04N 21/816* (2013.01); *G06T 19/20* (2013.01); *H04N 13/275* (2018.05); *H04N 13/351* (2018.05); *G06T 2219/2016* (2013.01)

(58) Field of Classification Search
CPC .. H04N 21/816; H04N 13/351; H04N 13/275; G06T 19/20; G06T 2219/2016
USPC ......................................................... 348/43
See application file for complete search history.

(56) References Cited

U.S. PATENT DOCUMENTS

| | | | |
|---|---|---|---|
| 2023/0283763 A1 | 9/2023 | Kurihara | |
| 2025/0078343 A1* | 3/2025 | Chen ..................... | G06F 40/109 |
| 2025/0078347 A1* | 3/2025 | Couleaud ................. | G06T 7/62 |
| 2025/0104349 A1* | 3/2025 | Bi ........................... | G06T 15/20 |
| 2025/0131626 A1* | 4/2025 | Mun ....................... | G06T 11/60 |

FOREIGN PATENT DOCUMENTS

| | | | | |
|---|---|---|---|---|
| CN | 116843833 A | 10/2023 | | |
| CN | 117036595 A * | 11/2023 | ............. | G06T 17/00 |
| CN | 119625132 A * | 3/2025 | ............. | G06T 11/60 |

OTHER PUBLICATIONS

Liu et al.; "Zero-1-to-3: Zero-shot One Image to 3D Object"; https://zero123.cs.columbia.edu/; accessed Jan. 24, 2024; 3 pages.

(Continued)

*Primary Examiner* — Behrooz M Senfi

(74) *Attorney, Agent, or Firm* — BakerHostetler

(57) ABSTRACT

The present disclosure describes techniques for generating three-dimensional videos based on text using machine learning models. Text and inputting data indicative of a set of multi-view images are input into a machine learning model. Content of the set of multi-view images is associated with the input text. The machine learning model comprises a plurality of sub-models corresponding to a plurality of sets of camera parameters. A plurality of sets of multi-view images is generated based on corresponding camera parameters by the plurality of sub-models. The plurality of sub-models are configured to run in parallel to generate the plurality of sets of multi-view images. A three-dimensional (3D) video is generated based on the plurality of sets of multi-view images. Content of the 3D video is associated with the input text.

20 Claims, 11 Drawing Sheets

600

Input text into a machine learning model and inputting data indicative of a set of multi-view images into the machine learning model, wherein content of the set of multi-view images is associated with the input text, and wherein the machine learning model comprises a plurality of sub-models corresponding to a plurality of sets of camera parameters 602

Generate a plurality of sets of multi-view images based on corresponding camera parameters by the plurality of sub-models, wherein the plurality of sub-models are configured to run in parallel to generate the plurality of sets of multi-view images 604

Generate a three-dimensional (3D) video based on the plurality of sets of multi-view images, wherein content of the 3D video is associated with the input text 606

(56) References Cited

OTHER PUBLICATIONS

International Search Report and Written Opinion for International Application No. PCT/SG2024/050760, mailed Jan. 27, 2025, 11 pages.

Lin C-H., et al., "Magic3D: High-Resolution Text-to-3D Content Creation," arXiv:2211.10440v2, Mar. 25, 2023, pp. 1-18. [Retrieved on Jan. 22, 2025] Retrieved from the Internet URL: https://arxiv.org/abs/2211.10440v2].

Poole B., et al., "DreamFusion: Text-to-3D Using 2D Diffusion," Cornell University, arXiv:2209.14988v1 [cs.CV], Sep. 29, 2022, 18 Pages.

* cited by examiner

200

A bulldog wearing a pirate hat

Text 201

First Machine Learning Model 102

A set of Multi-view Images / Latent Representations of the set of Multi-view Images 203

Second Machine Learning Model 104

3D Video 205

400

404

A bulldog wearing a pirate hat

Text 401

A set of Multi-view Images / Latent Representations of the set of Multi-view Images 403

402

405

407a-n

Second Machine Learning Model 104

500
FIG. 5

600

Input text into a machine learning model and inputting data indicative of a set of multi-view images into the machine learning model, wherein content of the set of multi-view images is associated with the input text, and wherein the machine learning model comprises a plurality of sub-models corresponding to a plurality of sets of camera parameters 602

Generate a plurality of sets of multi-view images based on corresponding camera parameters by the plurality of sub-models, wherein the plurality of sub-models are configured to run in parallel to generate the plurality of sets of multi-view images 604

Generate a three-dimensional (3D) video based on the plurality of sets of multi-view images, wherein content of the 3D video is associated with the input text 606

Training a machine learning model using sets of training images and text description, wherein a set of condition images is embedded into the machine learning model during the training process, wherein the set of condition images comprises images of a same object from different perspective views, and wherein the set of condition images has a high resolution and a multi-view consistency 702

Input text into the trained machine learning model and inputting data indicative of a set of multi-view images into the trained machine learning model, wherein content of the set of multi-view images is associated with the input text, and wherein the trained machine learning model comprises a plurality of sub-models corresponding to a plurality of sets of camera parameters 704

Generate a plurality of sets of multi-view images based on corresponding camera parameters by the plurality of sub-models, wherein the plurality of sub-models are configured to run in parallel to generate the plurality of sets of multi-view images 706

Generate a three-dimensional (3D) video based on the plurality of sets of multi-view images, wherein content of the 3D video is associated with the input text 708

Training a machine learning model using sets of training images and text description
802

Embed a set of condition images into the machine learning model during the training process, wherein the set of condition images comprises four images of a same object from four orthogonal perspective views, and wherein the sets of training images have camera offsets relative to the set of condition images 804

Encode a set of condition images and text, wherein text depicts the same object in the set of condition images 902

Embed the set of condition images by fusing the encoded set of condition images and the encoded text using a cross attention layer 904

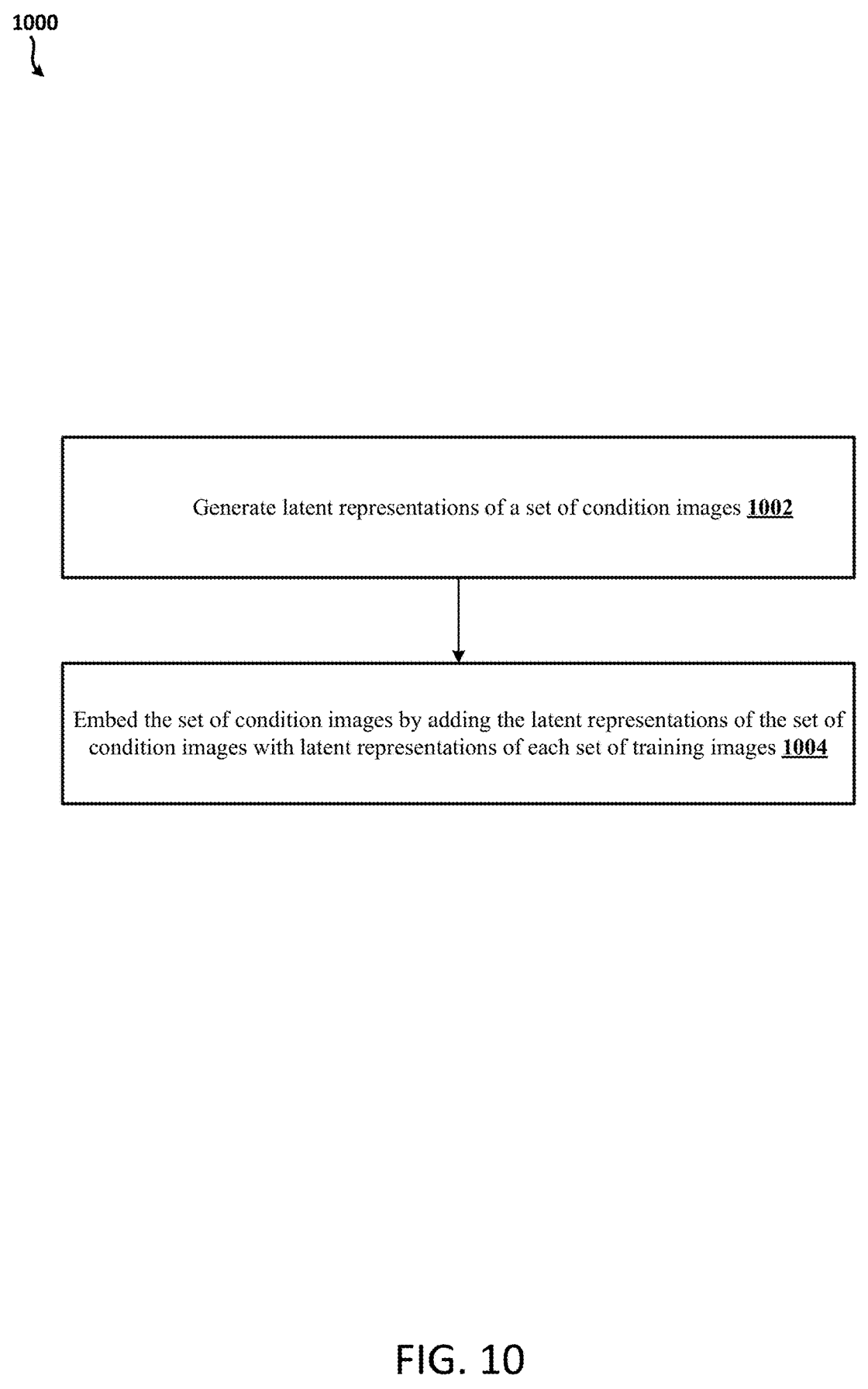

1000

Generate latent representations of a set of condition images __1002__

Embed the set of condition images by adding the latent representations of the set of condition images with latent representations of each set of training images __1004__

FIG. 10

GENERATING THREE-DIMENSIONAL VIDEOS BASED ON TEXT USING MACHINE LEARNING MODELS

BACKGROUND

Machine learning models are increasingly being used across a variety of industries to perform a variety of different tasks. Such tasks may include content generation. Improved techniques for utilizing machine learning models for content generation are desirable.

BRIEF DESCRIPTION OF THE DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 5 shows an example system for training a machine learning model to generate 3D videos in accordance with the present disclosure.

FIG. 6 shows an example process for generating 3D videos based on text using machine learning models in accordance with the present disclosure.

FIG. 7 shows an example process for generating 3D videos based on text using machine learning models in accordance with the present disclosure.

FIG. 8 shows an example process for training a machine learning model in accordance with the present disclosure.

FIG. 10 shows an example process for embedding a set of condition images into a machine learning model in accordance with the present disclosure.

DETAILED DESCRIPTION OF ILLUSTRATIVE EMBODIMENTS

Machine learning models may be used to generate three-dimensional (3D) assets (e.g., animations, content, models, etc.). Such machine learning models may generate the 3D assets based on text prompts, such as text prompts received from users. The users may input text associated with a desired 3D asset, and the machine learning model may generate a 3D asset corresponding to the input text. The generated 3D assets can be used as materials for education, games, or toys. The generated 3D assets can be used for secondary processing, editing, action skeleton intervention, animation, and more.

However, existing 3D asset generation methods can be very slow and/or inefficient. For example, it may take existing 3D asset generation methods anywhere from thirty minutes to two hours to generate a single, high quality 3D asset. Further, after a 3D asset has been generated, a user may want to edit or modify the 3D asset. Thus, a user may need to wait a long period time to see the initial generated 3D asset, then must wait another long period of time to see the updated 3D asset. As such, it is desirable to quickly provide users with a visualization of the 3D asset. The user may be able to decide if he or she wants to make edits or modifications to the text prompt.

Figure 1:
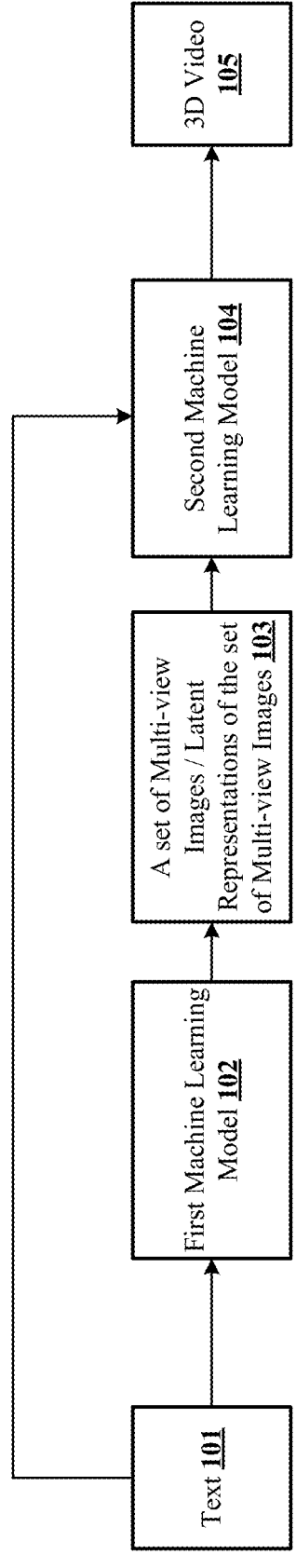
FIG. 1 shows an example system for generating three-dimensional (3D) videos based on text using machine learning models in accordance with the present disclosure.

Described herein are techniques for quickly providing users with a visualization of a 3D asset. FIG. 1 illustrates an example system 100 for generating 3D videos based on text using machine learning models. The 3D videos may provide users with a quick visualization of a 3D asset. The system 100 may comprise a first machine learning model 102 and a second machine learning model 104.

The first machine learning model 102 may be configured to generate a set of multi-view images 103 and/or latent representations of the set of multi-view images 103 based on text 101. For example, the first machine learning model 102 comprises the neural network model for generating a set of multi-view images as described in U.S. patent application Ser. No. 18/238,780 filed on Aug. 28, 2023, the disclosure of which is incorporated herein by reference in its entirety. The text 101 may be input by (e.g., received from) a user. The text 101 may be indicative of a 3D asset that the user wants to generate. The set of multi-view images 103 may comprise a set of four images of a same object from four different orthogonal perspective views. For example, the set of multi-view images may comprise a set of four images of a same object from a front (e.g., 0 degree) view, a first side (e.g., 90 degree) view, a back (e.g., 180 degree) view, and a second side (e.g., 270 degree) view. The object may be associated with the text 101.

The text 101 may be input into the second machine learning model 104. The set of multi-view images or latent representations of the set of multi-view images 103 may be input into the second machine learning model 104. The second machine learning model 104 may generate a plurality of sets of multi-view images based on the text 101 and the set of multi-view images or latent representations of the set of multi-view images 103. The plurality of sets of multi-view images may correspond to the text 101. Each of the plurality of sets of multi-view images may comprise four images of the same object from four orthogonal perspective views. There may be a predetermined camera offset between any two adjacent sets among the plurality of sets of camera parameters.

In embodiments, the second machine learning model 104 may comprise a plurality of sub-models. The plurality of sub-models may correspond to a plurality of sets of camera parameters. For example, each of the plurality of sub-models may correspond to a particular set of camera parameters among the plurality of sets of camera parameters. The plurality of sub-models may generate the plurality of sets of multi-view images based on corresponding camera parameters. The plurality of sub-models may be configured to run in parallel to generate the plurality of sets of multi-view images. For example, each of the plurality of sub-models may simultaneously generate one of the plurality of sets of multi-view images. As such, the plurality of sets of multi-view images may be quickly generated.

In embodiments, there may be a predetermined camera offset between any two adjacent sets among the plurality of sets of camera parameters. The predetermined camera offset may comprise any offset, such as 5 degrees, 6 degrees, 7, degrees, 8 degrees, 10 degrees, 11 degrees, 11.25 degrees, 12 degrees, 13 degrees, 14 degrees, 15 degrees, etc.

For example, if the predetermined camera offset is 15 degrees, the plurality sets of multi-view images generated by the second machine learning model may include: a first set of multi-view images comprising four images of the same object from a 15 degree view, a 105 degree view, and 195 degree view, and a 285 degree view, a second set of multi-view images comprising four images of the same object from a 30 degree view, a 120 degree view, and 210 degree view, and a 300 degree view, a third set of multi-view images comprising four images of the same object from a 45 degree view, a 135 degree view, and 225 degree view, and a 315 degree view, a fourth set of multi-view images comprising four images of the same object from a 60 degree view, a 150 degree view, and 240 degree view, and a 330 degree view, a fifth set of multi-view images comprising four images of the same object from a 75 degree view, a 165 degree view, and 255 degree view, and a 345 degree view.

As another example, if the predetermined camera offset is 11.25 degrees, the plurality sets of multi-view images generated by the second machine learning model may include: a first set of multi-view images comprising four images of the same object from a 11.25 degree view, a 101.25 degree view, and 191.25 degree view, and a 281.25 degree view, a second set of multi-view images comprising four images of the same object from a 22.5 degree view, a 112.5 degree view, and 202.5 degree view, and a 292.5 degree view, a third set of multi-view images comprising four images of the same object from a 33.75 degree view, a 123.75 degree view, and 213.75 degree view, and a 303.75 degree view, a fourth set of multi-view images comprising four images of the same object from a 45 degree view, a 135 degree view, and 225 degree view, and a 315 degree view, a fifth set of multi-view images comprising four images of the same object from a 56.25 degree view, a 146.25 degree view, and 236.25 degree view, and a 326.25 degree view, a sixth set of multi-view images comprising four images of the same object from a 67.5 degree view, a 157.5 degree view, and 247.5 degree view, and a 337.5 degree view, a seventh set of multi-view images comprising four images of the same object from a 78.75 degree view, a 168.75 degree view, and 258.75 degree view, and a 348.75 degree view, and an eighth set of multi-view images comprising four images of the same object from a 90 degree view, a 180 degree view, and 270 degree view, and a 360 degree view.

In embodiments, a 3D video 105 may be generated based on the plurality of sets of multi-view images. For example, the frames of the 3D video 105 may comprise the plurality of sets of multi-view images. The 3D video 105 may depict the object smoothly rotating from a 0 degree view to a 360 degree view. The object may complete one or more full (e.g., 360 degree) rotations in the 3D video.

Figure 2:
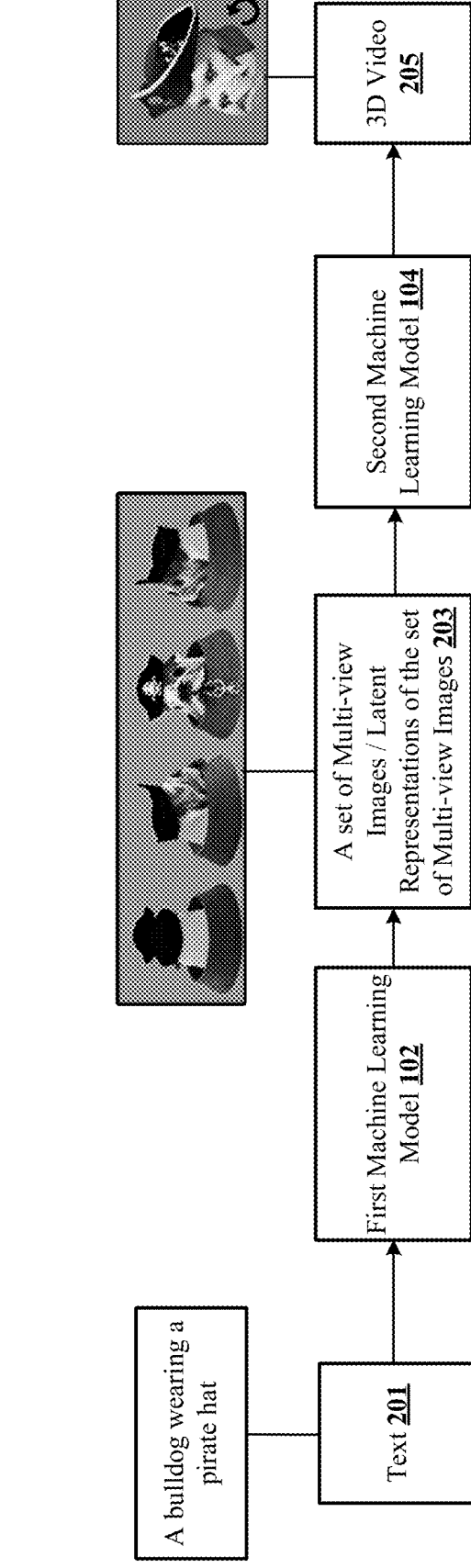
FIG. 2 shows an example system for generating 3D videos based on text using machine learning models in accordance with the present disclosure.

FIG. 2 illustrates an example system 200 for generating 3D videos based on text using machine learning models. The system 200 may comprise the first machine learning model 102 and the second machine learning model 104.

As described above, the first machine learning model 102 may be configured to generate a set of multi-view images and/or latent representations of the set of multi-view images based on text 201. The text 201 (e.g., "A bulldog wearing a pirate hat") may be input by (e.g., received from) a user. The text 201 may be indicative of a 3D asset that the user wants to generate. For example, the text 201 may indicate that the user wants to generate a 3D asset of a bulldog wearing a pirate hat. The first machine learning model 102 may generate a set of multi-view images 203 and/or latent representations of the set of multi-view images 203. For example, the set of multi-view images 203 may comprise a set of four images of a bulldog wearing a pirate hat from four different orthogonal perspective views. For example, the set of multi-view images 203 may comprise a set of four images of a bulldog wearing a pirate hat from a front (e.g., 0 degree) view, a first side (e.g., 90 degree) view, a back (e.g., 180 degree) view, and a second side (e.g., 270 degree) view.

The text 201 may be input into the second machine learning model 104. The set of multi-view images 203 or the latent representations of the set of the multi-view images 203 may be input into the second machine learning model 104. The second machine learning model 104 may utilize the text 201 and the set of multi-view images 203 or corresponding latent representations of the set of multi-view images 203 to generate a plurality of sets of multi-view images. The plurality of sets of multi-view images may correspond to the text 201. For example, each of the plurality of sets of multi-view images may comprise four images of a bulldog wearing a pirate hat from four orthogonal perspective views (e.g., four orthogonal perspective views different from those in the set of multi-view images 203).

In embodiments, a 3D video 205 is generated based on the plurality of sets of multi-view images of the bulldog wearing a pirate hat. For example, the frames of the 3D video 205 may comprise the plurality of sets of multi-view images. The 3D video 205 may depict the bulldog wearing a pirate hat smoothly rotating from a 0 degree view to 180 degree view to a 360 degree view. The 3D video 205 may provide the user with a quick visualization of the bulldog wearing a pirate hat. Based on the 3D video 205, the user may be able to decide if he or she wants to make edits or modifications to the text prompt "a bulldog wearing a pirate hat.". For example, the user may view the 3D video 205 and decide that he or she instead wants to generate a 3D asset of a bulldog wearing a cowboy hat.

Figure 3:
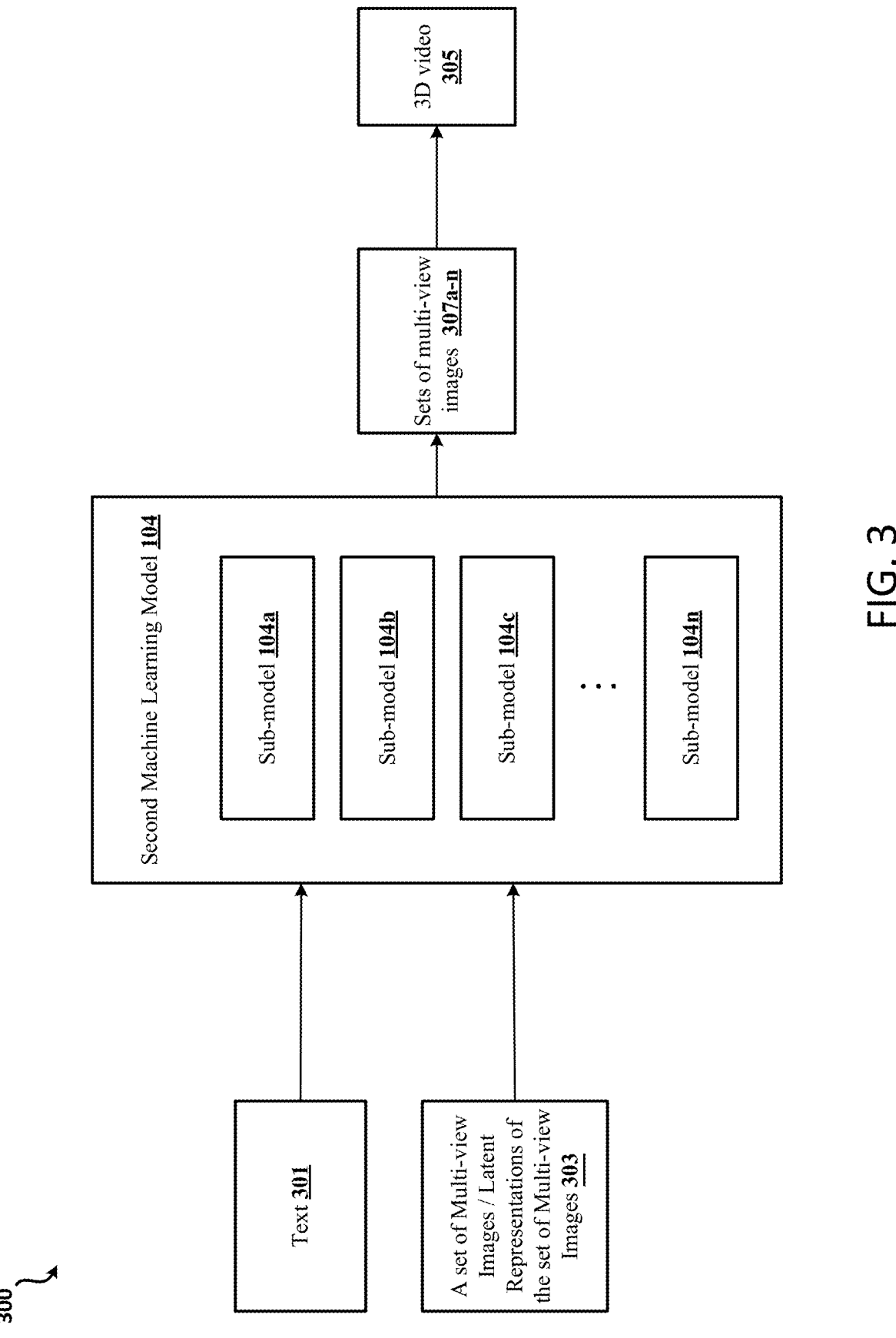
FIG. 3 shows an example system for generating 3D videos based on text using machine learning models in accordance with the present disclosure.

FIG. 3 shows an example system 300 for generating 3D videos based on text using machine learning models in accordance with the present disclosure. The system 300 may comprise the second machine learning model 104. The second machine learning model 104 may receive, as input, text 301 and a set of multi-view images 303 or latent representations the set of multi-view images 303. The text 301 may be input by (e.g., received from) a user. The text 301 may be indicative of a 3D asset that the user wants to generate. The set of multi-view images 303 may comprise a set of four images of a same object from four different orthogonal perspective views. For example, the set of multi-view images 303 may comprise a set of four images of a same object from a front (e.g., 0 degree) view, a first side (e.g., 90 degree) view, a back (e.g., 180 degree) view, and a second side (e.g., 270 degree) view. The object may be associated with the text 301. The set of multi-view images 303 and/or the latent representations of the set of multi-view images 303 may be generated by a machine learning model (e.g., the first machine learning model 102). Alternatively, the set of multi-view images 303 and/or the latent representations of the set of multi-view images 303 may be generated by another machine learning model, and/or generated by any other suitable technique.

The second machine learning model 104 may generate a plurality of sets of multi-view images 307a-n based on the text 301 and the set of multi-view images 303 or the latent representations the set of multi-view images 303. The second machine learning model 104 may comprise a plurality of sub-models 104a-n. The plurality of sub-models 104a-n may correspond to a plurality of sets of camera parameters. For example, each of the plurality of sub-models 104a-n may correspond to a particular set of camera parameters among the plurality of sets of camera parameters. The plurality of sub-models 104a-n may generate the plurality of sets of multi-view images 307a-n based on corresponding camera parameters. For example, the sub-model 104a may generate the set of multi-view images 307a, the sub-model 104b may generate the set of multi-view images 307b, the sub-model 104c may generate the set of multi-view images 307c, and so on. The plurality of sub-models 104a-n may be configured to run in parallel to generate the plurality of sets of multi-view images 307a-n. For example, the plurality of sub-models 104a-n may be configured to simultaneously generate the plurality of sets of multi-view images 307a-n, respectively. In embodiments, there may be a predetermined camera offset between any two adjacent sets among the plurality of sets of camera parameters. The predetermined camera offset may comprise any offset, such as 5 degrees, 6 degrees, 7, degrees, 8 degrees, 10 degrees, 11 degrees, 11.25 degrees, 12 degrees, 13 degrees, 14 degrees, 15 degrees, etc.

In embodiments, a 3D video 305 is generated based on the plurality of sets of multi-view images 307a-n. For example, the frames of the 3D video 305 may comprise the plurality of sets of multi-view images 307a-n. The 3D video 305 may depict the object smoothly rotating from a 0 degree view to 180 degree view to a 360 degree view. The 3D video 305 may provide the user with a quick visualization of the 3D asset. Based on the 3D video 305, the user may be able to decide if he or she wants to make edits or modifications to the text prompt.

Figure 4:
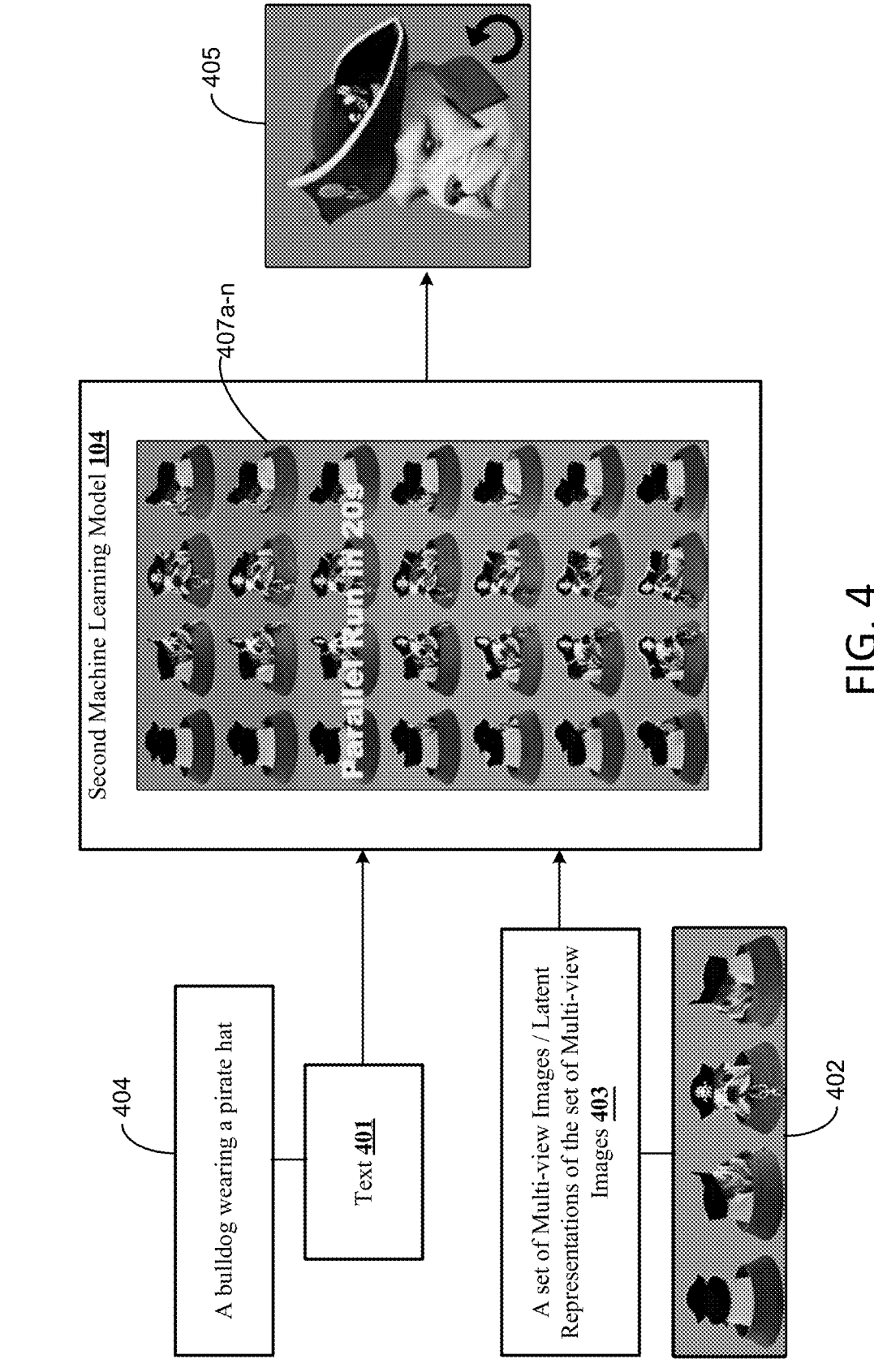
FIG. 4 shows an example system for generating 3D videos based on text using machine learning models in accordance with the present disclosure.

FIG. 4 shows an example system 400 for generating 3D videos based on text using machine learning models in accordance with the present disclosure. The system 400 may comprise the second machine learning model 104. The second machine learning model 104 may receive, as input, text 401 (e.g., the text "A bulldog wearing a pirate hat" 404) and a set of multi-view images or latent representations the set of multi-view images 403 (e.g., the set of multi-view images 402). The text 401 may be input by (e.g., received from) a user. The text 401 may be indicative of a 3D asset that the user wants to generate. For example, the text 401 may indicate that the user wants to generate a 3D asset of a bulldog wearing a pirate hat.

The set of multi-view images 402 may comprise a set of four images of a same object from four different orthogonal perspective views. For example, the multi-view images may comprise a set of four images of a bulldog wearing a pirate hat from a front (e.g., 0 degree) view, a first side (e.g., 90 degree) view, a back (e.g., 180 degree) view, and a second side (e.g., 270 degree) view. The set of multi-view images 403 and/or the latent representations of the set of multi-view images 403 may be generated by the first machine learning model 102. Alternatively, the set of multi-view images 403 and/or the latent representations of the set of multi-view images 403 may be generated by another machine learning model, and/or generated any other suitable technique.

The second machine learning model 104 may generate a plurality of sets of multi-view images 407a-n of a bulldog wearing a pirate hat based on the text 401 (e.g., the text "A bulldog wearing a pirate hat" 404) and the set of multi-view images 403 or latent representations the set of multi-view images 403 (e.g., the set of multi-view images 402). The second machine learning model 104 may comprise a plurality of sub-models. The plurality of sub-models may correspond to a plurality of sets of camera parameters. For example, each of the plurality of sub-models may correspond to a particular set of camera parameters among the plurality of sets of camera parameters. The plurality of sub-models may generate the plurality of sets of multi-view images 407a-n of the bulldog wearing a pirate hat based on corresponding camera parameters. The plurality of sub-models may be configured to run in parallel to generate the plurality of sets of multi-view images 407a-n of the bulldog wearing a pirate hat. For example, the plurality of sub-models may be configured to simultaneously generate the corresponding sets of multi-view images of the bulldog wearing a pirate hat.

In embodiments, there may be a predetermined camera offset between any two adjacent sets among the plurality of sets of camera parameters. The predetermined camera offset may comprise any offset, such as 5 degrees, 6 degrees, 7, degrees, 8 degrees, 10 degrees, 11 degrees, 11.25 degrees, 12 degrees, 13 degrees, 14 degrees, 15 degrees, etc.

In the example of FIG. 4, the predetermined camera offset is 11.25 degrees. The plurality of sets of multi-view images 407a-n comprises eight sets of multi-view images. A first set of the plurality of sets of multi-view images 407a-n may comprise four images of the bulldog wearing a pirate hat from a 11.25 degree view, a 101.25 degree view, and 191.25 degree view, and a 281.25 degree view, a second set of the plurality of sets of multi-view images 407a-n may comprise four images of the same bulldog wearing a pirate hat from a 22.5 degree view, a 112.5 degree view, and 202.5 degree view, and a 292.5 degree view, a third set of the plurality of sets of multi-view images 407a-n may comprise four images of the same bulldog wearing a pirate hat from a 33.75 degree view, a 123.75 degree view, and 213.75 degree view, and a 303.75 degree view, a fourth set of the plurality of sets of multi-view images 407a-n may comprise four images of the same bulldog wearing a pirate hat from a 45 degree view, a 135 degree view, and 225 degree view, and a 315 degree view, a fifth set of the plurality of sets of multi-view images 407a-n may comprise four images of the same bulldog wearing a pirate hat from a 56.25 degree view, a 146.25 degree view, and 236.25 degree view, and a 326.25 degree view, a sixth set of the plurality of sets of multi-view images 407a-n may comprise four images of the same bulldog wearing a pirate hat from a 67.5 degree view, a 157.5 degree view, and 247.5 degree view, and a 337.5 degree view, a seventh set of the plurality of sets of multi-view images 407a-n may comprise four images of the same bulldog wearing a pirate hat from a 78.75 degree view, a 168.75 degree view, and 258.75 degree view, and a 348.75 degree view, and an eighth set of the plurality of sets of multi-view images 407a-n may comprise four images of the same bulldog wearing a pirate hat from a 90 degree view, a 180 degree view, and 270 degree view, and a 360 degree view.

In embodiments, a 3D video 405 may be generated based on the plurality of sets of multi-view images 407a-n. For example, the frames of the 3D video 405 may comprise the plurality of sets of multi-view images 407a-n. The 3D video 405 may depict the bulldog wearing a pirate hat smoothly rotating from a 0 degree view to 180 degree view to a 360 degree view. The 3D video 405 may provide the user with a quick visualization of the of the bulldog wearing a pirate hat. Based on the 3D video 405, the user may be able to decide if he or she wants to make edits or modifications to the text prompt "A bulldog wearing a pirate hat."

FIG. 5 shows an example system 500 for training a machine learning model to generate 3D videos in accordance with the present disclosure. The system 500 may be used, for example, to train the second machine learning model 104. The system 500 may embed a set of condition images 501 into the machine learning model (e.g., the second machine learning model 104). The set of condition images 501 may be generated by another machine learning model. For example, the set of condition images 501 may be generated by the first machine learning model 102 based on input text.

The set of condition images 501 may comprise images of a same object from different perspective views. The set of condition images 501 may comprise four images of the same object from four orthogonal perspective views. For example, the set of condition images 501 may comprise four images of the same object from a front (e.g., 0 degree) view, a first side (e.g., 90 degree) view, a back (e.g., 180 degree) view, and a second side (e.g., 270 degree) view. The set of condition images 501 may have a high resolution and a multi-view consistency.

In embodiments, embedding the set of condition images 501 into the machine learning model comprises encoding the set of condition images 501 and encoding text 502. The text 502 may describe the same object in the set of condition images 501. Embedding the set of condition images 501 into the machine learning model may comprise embedding the set of condition images 501 by fusing the encoded set of condition images and the encoded text using a cross attention layer.

In embodiments, the set of condition images 501 and the text 502 may be encoded using a contrastive language-image pre-training (CLIP) encoder or any other suitable encoder. CLIP is a neural network which efficiently learns visual concepts from natural language supervision. The CLIP encoding may encode the image to a high level understanding that is compatible with the text embedding. The set of condition images 501 may be input into a CLIP encoder 504a and the text 502 may be input into a CLIP encoder 504b. The CLIP encoder 504a may perform encoding on the set of condition images 501. The CLIP encoder 504b may perform encoding on the text 502. The encoded condition images 501 may be fused as context with the encoded text. A cross attention layer 506 may be used to embed the context for the images.

In embodiments, embedding the set of condition images 501 into the machine learning model comprises generating latent representations of the set of condition images 501. Embedding the set of condition images 501 into the machine learning model may comprise embedding the set of condition images by adding the latent representations of the set of condition images with latent representations of each of a plurality of sets of training images (e.g., sets of input images 508a-n). The plurality of sets of training images 508a-n may have camera offsets relative to the set of condition images 501.

In embodiments, the latent representations of the set of condition images 501 and/or the latent representations of each of the plurality of sets of training images 508a-n may be generated by variational autoencoder (VAE) encoding. A VAE is a generative artificial intelligence (AI) algorithm that uses deep learning to generate new content, detect anomalies, and remove noise. The set of condition images 501 may be input into a VAE encoder 510a. The VAE encoder 510a may generate the latent representations of the set of condition images 501. The latent representations of the set of condition images 501 may be input into a convolution layer 512. The convolution layer 512 may extract features from the latent representations of the set of condition images 501. The plurality of sets of training images 508a-n may be input into a VAE encoder 510b. The VAE encoder 510b may generate the latent representations of the plurality of sets of training images 508a-n. Noise 514 may be added to the latent representations of the plurality of sets of training images 508a-n. The noised latent representations of each of the plurality of sets of training images 508a-n may be concatenated (e.g., by a concatenator 516) with the output of the convolution layer 512. The concatenation may be input into the machine learning model. This process may be repeated for each set of the plurality of sets of training images 508a-n.

In embodiments, the camera parameters 530 associated with the plurality of sets of training images 508a-n may be input into the machine learning model. The camera parameters 530 associated with a particular set of training images may represent the different view orientations within that set of training images. The camera parameters of a particular set of training images may be combined with a corresponding time embedding (i.e., a timestep 545 for diffusion). A same timestep may be shared among each image in a set of multi-view images.

FIG. 6 illustrates an example process 600 for generating 3D videos based on text using machine learning models. Although depicted as a sequence of operations in FIG. 6, those of ordinary skill in the art will appreciate that various embodiments may add, remove, reorder, or modify the depicted operations.

At 602, text may be input into a machine learning model (e.g., the second machine learning model 104). The text may be input by (e.g., received from) a user. The text may be indicative of a 3D asset that the user wants to generate. Data indicative of a set of multi-view images may be input into the machine learning model. The set of multi-view images may comprise a set of four images of a same object from four different orthogonal perspective views. For example, the multi-view images may comprise a set of four images of a same object from a front (e.g., 0 degree) view, a first side (e.g., 90 degree) view, a back (e.g., 180 degree) view, and a second side (e.g., 270 degree) view. Content of the set of multi-view images may be associated with the input text. For example, the object may be associated with the text. The machine learning model may comprise a plurality of submodels. The plurality of sun-models may correspond to a plurality of sets of camera parameters.

The machine learning model may utilize the text and the data indicative of the set of multi-view images to generate a plurality of sets of multi-view images. The plurality of sets of multi-view images may correspond to the text. At 604, the plurality of sets of multi-view images may be generated. The plurality of sets of multi-view images may be generated by the plurality of sub-models. The plurality of sets of multiview images may be generated based on corresponding camera parameters. The plurality of sub-models may be configured to run in parallel to generate the plurality of sets of multi-view images. Each of the plurality of sets of multi-view images may comprise four images of the same object from four orthogonal perspective views.

At 606, a 3D video may be generated. The 3D video may be generated based on the plurality of sets of multi-view images. Content of the 3D video may be associated with the input text. For example, the frames of the 3D video may comprise the plurality of sets of multi-view images. The 3D video may depict the object smoothly rotating from a 0 degree view to 180 degree view to a 360 degree view. The 3D video may provide the user with a quick visualization of the 3D asset. Based on the 3D video, the user may be able to decide if he or she wants to make edits or modifications to the input text.

FIG. 7 illustrates an example process 700 for generating 3D videos based on text using machine learning models. Although depicted as a sequence of operations in FIG. 7, those of ordinary skill in the art will appreciate that various embodiments may add, remove, reorder, or modify the depicted operations.

At 702, a machine learning model (e.g., the second machine learning model 104) may be trained. The machine learning model may be trained using sets of training images and text description. A set of condition images may be embedded into the machine learning model during the training process. The set of condition images may comprise images of a same object from different perspective views. The set of condition images may have a high resolution and a multi-view consistency.

At 704, text may be input into the trained machine learning model. The text may be input by (e.g., received from) a user. The text may be indicative of a 3D asset that the user wants to generate. Data indicative of a set of multi-view images may be input into the machine learning model. The set of multi-view images may comprise a set of four images of a same object from four different orthogonal perspective views. For example, the multi-view images may comprise a set of four images of a same object from a front (e.g., 0 degree) view, a first side (e.g., 90 degree) view, a back (e.g., 180 degree) view, and a second side (e.g., 270 degree) view. Content of the set of multi-view images may be associated with the input text. For example, the object in the set of multi-view images may be associated with the text. The trained machine learning model may comprise a plurality of sub-models. The plurality of sun-models may correspond to a plurality of sets of camera parameters.

The trained machine learning model may utilize the text and the data indicative of the set of multi-view images to generate a plurality of sets of multi-view images. The plurality of sets of multi-view images may correspond to the text. At 706, the plurality of sets of multi-view images may be generated. The plurality of sets of multi-view images may be generated by the plurality of sub-models. The plurality of sets of multi-view images may be generated based on corresponding camera parameters. The plurality of sub-models may be configured to run in parallel to generate the plurality of sets of multi-view images. Each of the plurality of sets of multi-view images may comprise four images of the same object from four orthogonal perspective views.

At 708, a 3D video may be generated. The 3D video may be generated based on the plurality of sets of multi-view images. Content of the 3D video may be associated with the input text. For example, the frames of the 3D video may comprise the plurality of sets of multi-view images. The 3D video may depict the object smoothly rotating from a 0 degree view to 180 degree view to a 360 degree view. The 3D video may provide the user with a quick visualization of the 3D asset. Based on the 3D video, the user may be able to decide if he or she wants to make edits or modifications to the input text.

FIG. 8 illustrates an example process 800 for training a machine learning model. Although depicted as a sequence of operations in FIG. 8, those of ordinary skill in the art will appreciate that various embodiments may add, remove, reorder, or modify the depicted operations.

At 802, a machine learning model (e.g., the second machine learning model 104) may be trained. The machine learning model may be trained using sets of training images and text description. At 804, a set of condition images may be embedded into the machine learning model during the training process. The set of condition images may comprise images of a same object from different perspective views. The set of condition images comprises four images of a same object from four orthogonal perspective views. The set of condition images may have a high resolution and a multi-view consistency. The sets of training images may have camera offsets relative to the set of condition images.

Figure 9:
FIG. 9 shows an example process for embedding a set of condition images into a machine learning model in accordance with the present disclosure.

FIG. 9 illustrates an example process 900 for embedding a set of condition images into a machine learning model. Although depicted as a sequence of operations in FIG. 9, those of ordinary skill in the art will appreciate that various embodiments may add, remove, reorder, or modify the depicted operations.

A set of condition images may be embedded into a machine learning model (e.g., the machine learning model 104). Embedding the set of condition images into the machine learning model may comprise encoding the set of condition images and encoding text. At 902, a set of condition images and text may be encoded. The text may depict the same object in the set of condition images. In embodiments, the set of condition images and the text may be encoded using a CLIP encoder or any other suitable encoder. The set of condition images 501 may be input into a CLIP encoder. the text may also be input into a CLIP encoder. The CLIP encoder(s) may perform CLIP encoding on the set of condition images and on the text. At 904, the set of condition images may be embedded by fusing the encoded set of condition images and the encoded text using a cross attention layer. For example, the encoded condition images may be fused as context with the encoded text. A cross attention layer may be used to embed the context for the images.

FIG. 10 illustrates another example process 1000 for embedding a set of condition images into a machine learning model. Although depicted as a sequence of operations in FIG. 10, those of ordinary skill in the art will appreciate that various embodiments may add, remove, reorder, or modify the depicted operations.

A set of condition images may be embedded into a machine learning model (e.g., the second machine learning model 104). Embedding the set of condition images into the machine learning model may comprise generating latent representations of a set of condition images. At 1002, latent representations may be generated. The latent representations may comprise latent representations of a set of condition images. In embodiments, the latent representations of the set of condition images and/or the latent representations of each of a plurality of sets of training images may be generated by VAE encoders.

Embedding the set of condition images into the machine learning model may comprise embedding the set of condition images by adding the latent representations of the set of condition images with latent representations of each of a plurality of sets of training images. At 1004, the set of condition images may be embedded by adding the latent representations of the set of condition images with latent representations of each set of training images. The plurality of sets of training images may have camera offsets relative to the set of condition images. In embodiments, the latent representations of the set of condition images may be input into a convolution layer. The convolution layer may extract features from the latent representations of the set of condition images. Noise may be added to the latent representations of the plurality of sets of training images. The noised latent representations of the plurality of sets of training images may be concatenated with the output of the convolution layer. This process may be repeated for each set of the plurality of sets of training images.

Figure 11:
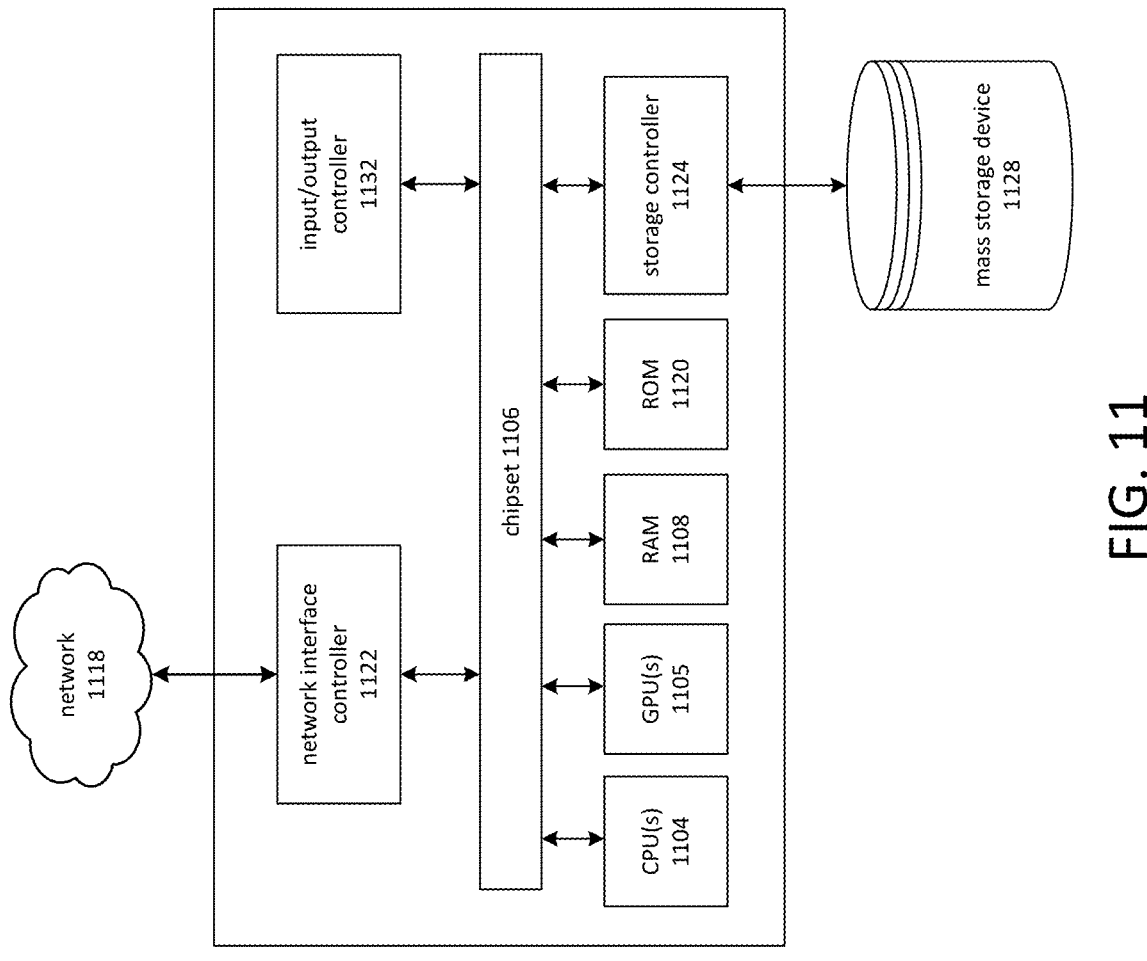
FIG. 11 shows an example computing device which may be used to perform any of the techniques disclosed herein.

FIG. 11 illustrates a computing device that may be used in various aspects, such as the models, components, and/or devices depicted in any of FIGS. 1-5. With regard to FIGS. 1-5, any or all of the components may each be implemented by one or more instance of a computing device 1100 of FIG. 11. The computer architecture shown in FIG. 11 shows a conventional server computer, workstation, desktop computer, laptop, tablet, network appliance, PDA, e-reader, digital cellular phone, or other computing node, and may be utilized to execute any aspects of the computers described herein, such as to implement the methods described herein.

The computing device 1100 may include a baseboard, or "motherboard," which is a printed circuit board to which a multitude of components or devices may be connected by way of a system bus or other electrical communication paths. One or more central processing units (CPUs) 1104 may operate in conjunction with a chipset 1106. The CPU(s) 1104 may be standard programmable processors that perform arithmetic and logical operations necessary for the operation of the computing device 1100.

The CPU(s) 1104 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 1104 may be augmented with or replaced by other processing units, such as GPU(s) 1105. The GPU(s) 1105 may comprise processing units specialized for but not necessarily limited to highly parallel computations, such as graphics and other visualization-related processing.

A chipset 1106 may provide an interface between the CPU(s) 1104 and the remainder of the components and devices on the baseboard. The chipset 1106 may provide an interface to a random-access memory (RAM) 1108 used as the main memory in the computing device 1100. The chipset 1106 may further provide an interface to a computer-readable storage medium, such as a read-only memory (ROM) 1120 or non-volatile RAM (NVRAM) (not shown), for storing basic routines that may help to start up the computing device 1100 and to transfer information between the various components and devices. ROM 1120 or NVRAM may also store other software components necessary for the operation of the computing device 1100 in accordance with the aspects described herein.

The computing device 1100 may operate in a networked environment using logical connections to remote computing nodes and computer systems through local area network (LAN). The chipset 1106 may include functionality for providing network connectivity through a network interface controller (NIC) 1122, such as a gigabit Ethernet adapter. A NIC 1122 may be capable of connecting the computing device 1100 to other computing nodes over a network 1116. It should be appreciated that multiple NICs 1122 may be present in the computing device 1100, connecting the computing device to other types of networks and remote computer systems.

The computing device 1100 may be connected to a mass storage device 1128 that provides non-volatile storage for the computer. The mass storage device 1128 may store system programs, application programs, other program modules, and data, which have been described in greater detail herein. The mass storage device 1128 may be connected to the computing device 1100 through a storage controller 1124 connected to the chipset 1106. The mass storage device 1128 may consist of one or more physical storage units. The mass storage device 1128 may comprise a management component 1110. A storage controller 1124 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 1100 may store data on the mass storage device 1128 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 1128 is characterized as primary or secondary storage and the like.

For example, the computing device 1100 may store information to the mass storage device 1128 by issuing instructions through a storage controller 1124 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1100 may further read information from the mass storage device 1128 by detecting the physical states or characteristics of one or more particular locations within the physical storage units.

In addition to the mass storage device 1128 described above, the computing device 1100 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 1100.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 1128 depicted in FIG. 11, may store an operating system utilized to control the operation of the computing device 1100. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 1128 may store other system or application programs and data utilized by the computing device 1100.

The mass storage device 1128 or other computer-readable storage media may also be encoded with computer-executable instructions, which, when loaded into the computing device 1100, transforms the computing device from a general-purpose computing system into a special-purpose computer capable of implementing the aspects described herein. These computer-executable instructions transform the computing device 1100 by specifying how the CPU(s) 1104 transition between states, as described above. The computing device 1100 may have access to computer-readable storage media storing computer-executable instructions, which, when executed by the computing device 1100, may perform the methods described herein.

A computing device, such as the computing device 1100 depicted in FIG. 11, may also include an input/output controller 1132 for receiving and processing input from a number of input devices, such as a keyboard, a mouse, a touchpad, a touch screen, an electronic stylus, or other type of input device. Similarly, an input/output controller 1132 may provide output to a display, such as a computer monitor, a flat-panel display, a digital projector, a printer, a plotter, or other type of output device. It will be appreciated that the computing device 1100 may not include all of the components shown in FIG. 11, may include other components that are not explicitly shown in FIG. 11, or may utilize an architecture completely different than that shown in FIG. 11.

As described herein, a computing device may be a physical computing device, such as the computing device 1100 of FIG. 11. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed is:

1. A method of generating three-dimensional videos based on text using machine learning models, comprising:
   inputting text into a machine learning model and inputting data indicative of a set of multi-view images into the machine learning model, wherein content of the set of multi-view images is associated with the input text, and wherein the machine learning model comprises a plurality of sub-models corresponding to a plurality of sets of camera parameters;
   generating a plurality of sets of multi-view images based on corresponding camera parameters by the plurality of sub-models, wherein the plurality of sub-models are configured to run in parallel to generate the plurality of sets of multi-view images; and
   generating a three-dimensional (3D) video based on the plurality of sets of multi-view images, wherein content of the 3D video is associated with the input text.

2. The method of claim 1, further comprising:
   embedding a set of condition images into the machine learning model during a process of training the machine learning model, wherein the set of condition images comprises images of a same object from different perspective views, and wherein the set of condition images has a high resolution and a multi-view consistency.

3. The method of claim 2, wherein the embedding a set of condition images into the machine learning model further comprises:
   encoding the set of condition images and encoding text, wherein the text describes the same object in the set of condition images; and
   embedding the set of condition images by fusing the encoded set of condition images and the encoded text using a cross attention layer.

4. The method of claim 2, wherein the embedding a set of condition images into the machine learning model further comprises:
   generating latent representations of the set of condition images; and
   embedding the set of condition images by adding the latent representations of the set of condition images with latent representations of each set of training images.

5. The method of claim 2, wherein the set of condition images is generated by another machine learning model, and wherein the other machine learning model is configured to generate a set of images from orthogonal perspective views based on input text.

6. The method of claim 2, wherein the set of condition images comprises four images of the same object from four orthogonal perspective views.

7. The method of claim 2, wherein the machine learning model is trained on a plurality of sets of training images, and wherein the plurality of sets of training images have camera offsets relative to the set of condition images.

8. The method of claim 1, wherein the data indicative of the set of multi-view images is generated based on the text by another machine learning model, wherein the other machine learning model is configured to generate a set of images from orthogonal perspective views based on input text.

9. The method of claim 1, wherein each of the plurality of sets of multi-view images comprises four images of a same object from four orthogonal perspective views, and wherein there is a predetermined camera offset between any two adjacent sets among the plurality of sets of camera parameters.

10. The method of claim 1, wherein the 3D video comprises a video in which a 3D object smoothly rotates.

11. A system of generating three-dimensional videos based on text using machine learning models, comprising:
  at least one processor; and
  at least one memory communicatively coupled to the at least one processor and comprising computer-readable instructions that upon execution by the at least one processor cause the at least one processor to perform operations comprising:
  inputting text into a machine learning model and inputting data indicative of a set of multi-view images into the machine learning model, wherein content of the set of multi-view images is associated with the input text, and wherein the machine learning model comprises a plurality of sub-models corresponding to a plurality of sets of camera parameters;
  generating a plurality of sets of multi-view images based on corresponding camera parameters by the plurality of sub-models, wherein the plurality of sub-models are configured to run in parallel to generate the plurality of sets of multi-view images; and
  generating a three-dimensional (3D) video based on the plurality of sets of multi-view images, wherein content of the 3D video is associated with the input text.

12. The system of claim 11, the operations further comprising:
  embedding a set of condition images into the machine learning model during a process of training the machine learning model, wherein the set of condition images comprises images of a same object from different perspective views, and wherein the set of condition images has a high resolution and a multi-view consistency.

13. The system of claim 12, wherein the embedding a set of condition images into the machine learning model further comprises:
  encoding the set of condition images and encoding text, wherein the text describes the same object in the set of condition images; and
  embedding the set of condition images by fusing the encoded set of condition images and the encoded text using a cross attention layer.

14. The system of claim 12, wherein the embedding a set of condition images into the machine learning model further comprises:
  generating latent representations of the set of condition images; and embedding the set of condition images by adding the latent representations of the set of condition images with latent representations of each set of training images.

15. The system of claim 12, wherein the set of condition images is generated by another machine learning model, and wherein the other machine learning model is configured to generate a set of images from orthogonal perspective views based on input text.

16. The system of claim 12, wherein the set of condition images comprises four images of the same object from four orthogonal perspective views.

17. A non-transitory computer-readable storage medium, storing computer-readable instructions that upon execution by a processor cause the processor to implement operations comprising:
  inputting text into a machine learning model and inputting data indicative of a set of multi-view images into the machine learning model, wherein content of the set of multi-view images is associated with the input text, and wherein the machine learning model comprises a plurality of sub-models corresponding to a plurality of sets of camera parameters;
  generating a plurality of sets of multi-view images based on corresponding camera parameters by the plurality of sub-models, wherein the plurality of sub-models are configured to run in parallel to generate the plurality of sets of multi-view images; and
  generating a three-dimensional (3D) video based on the plurality of sets of multi-view images, wherein content of the 3D video is associated with the input text.

18. The non-transitory computer-readable storage medium of claim 17, the operations further comprising:
  embedding a set of condition images into the machine learning model during a process of training the machine learning model, wherein the set of condition images comprises images of a same object from different perspective views, and wherein the set of condition images has a high resolution and a multi-view consistency.

19. The non-transitory computer-readable storage medium of claim 18, wherein the embedding a set of condition images into the machine learning model further comprises:
  encoding the set of condition images and encoding text, wherein the text describes the same object in the set of condition images; and
  embedding the set of condition images by fusing the encoded set of condition images and the encoded text using a cross attention layer.

20. The non-transitory computer-readable storage medium of claim 18, wherein the embedding a set of condition images into the machine learning model further comprises:
  generating latent representations of the set of condition images; and
  embedding the set of condition images by adding the latent representations of the set of condition images with latent representations of each set of training images.

* * * * *